(12) United States Patent
Masias

(10) Patent No.: US 11,156,317 B2
(45) Date of Patent: Oct. 26, 2021

(54) NOISE ATTENUATORS FOR USE WITH PROCESS CONTROL DEVICES

(71) Applicant: Emerson Process Management Regulator Technologies, Inc., McKinney, TX (US)

(72) Inventor: Justin Lane Masias, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 363 days.

(21) Appl. No.: 16/245,961

(22) Filed: Jan. 11, 2019

(65) Prior Publication Data

US 2019/0145566 A1   May 16, 2019

Related U.S. Application Data

(62) Division of application No. 15/395,227, filed on Dec. 30, 2016, now Pat. No. 10,208,880.

(51) Int. Cl.
*F16L 55/027* (2006.01)
*G10K 11/16* (2006.01)

(52) U.S. Cl.
CPC ....... *F16L 55/027* (2013.01); *F16L 55/02718* (2013.01); *G10K 11/161* (2013.01)

(58) Field of Classification Search
CPC . F16L 55/02718; F16L 55/027; G10K 11/161
USPC ....................................................... 181/255
See application file for complete search history.

(56) References Cited

U.S. PATENT DOCUMENTS

| 825,010 A | 7/1906 | Snow |
| 1,914,072 A | 6/1933 | Boylston |
| 3,642,095 A * | 2/1972 | Fujii ........................ F01N 1/10 |
| | | 181/271 |

(Continued)

FOREIGN PATENT DOCUMENTS

| DE | 1261712 | 2/1968 |
| FR | 2329164 | 5/1977 |

(Continued)

OTHER PUBLICATIONS

Emerson Process Management, Installation Guide, Oct. 2014, Retrieved at www.documentation.emersonprocess.com/groups/public/documents/safe_use_guides/d103068x014.pdf on Jan. 15, 2016, 10 pages.

(Continued)

*Primary Examiner* — Forrest M Phillips
(74) *Attorney, Agent, or Firm* — Hanley, Flight & Zimmerman, LLC

(57) ABSTRACT

Example noise attenuators for use with process control devices are described herein. An example apparatus includes a first plate and a second plate disposed in a fluid passageway of a noise attenuator. The second plate is spaced apart from the first plate. The example apparatus also includes a first support rod extending along a central axis of the fluid passageway. The first support rod is coupled to the first plate and to the second plate. The example apparatus further includes a second support rod extending along an axis parallel to and offset from the central axis. The second support rod is coupled to the first plate and the second plate.

20 Claims, 5 Drawing Sheets

(56) References Cited

U.S. PATENT DOCUMENTS

| | | | |
|---|---|---|---|
| 3,665,965 A * | 5/1972 | Baumann | F16L 55/04 138/42 |
| 4,050,479 A | 9/1977 | Baumann | |
| 4,203,503 A * | 5/1980 | Franco | F01N 1/02 181/272 |
| 4,375,841 A | 3/1983 | Vielbig | |
| 4,530,375 A | 7/1985 | Bey | |
| 4,751,980 A | 6/1988 | DeVane | |
| 5,327,941 A | 7/1994 | Bitsakis et al. | |
| 5,495,872 A | 3/1996 | Gallagher et al. | |
| 6,807,986 B2 | 10/2004 | Boger | |
| 7,325,474 B2 | 2/2008 | Yoshimura et al. | |
| 8,167,084 B1 | 5/2012 | Moore | |
| 8,307,943 B2 | 11/2012 | Klasing et al. | |
| 8,307,947 B2 | 11/2012 | Bussow | |
| 8,523,141 B2 | 9/2013 | Elliot et al. | |
| D720,670 S | 1/2015 | Maholick et al. | |
| 8,931,591 B2 | 1/2015 | Fagerlund et al. | |
| 9,534,725 B1 * | 1/2017 | Tecson | G05D 16/02 |
| 9,739,408 B2 * | 8/2017 | Tecson | G10K 11/161 |
| 10,208,880 B2 * | 2/2019 | Masias | G10K 11/161 |
| 2014/0069737 A1 | 3/2014 | May et al. | |
| 2015/0300525 A1 * | 10/2015 | Lin | F16L 55/0336 181/247 |
| 2016/0018178 A1 | 1/2016 | Johansen | |
| 2017/0205015 A1 * | 7/2017 | Tecson | G10K 11/161 |
| 2018/0187816 A1 * | 7/2018 | Masias | F16L 55/02718 |

FOREIGN PATENT DOCUMENTS

| | | |
|---|---|---|
| GB | 1512072 | 5/1978 |
| WO | 2009130652 | 10/2009 |

OTHER PUBLICATIONS

Emerson Process Management, "Type FL Pressure Reducing Regulators Bulletin 71.2.FL", Jul. 2015, Retrieved at www.documentation.emersonprocess.com/groups/public/documents/bulletins/d103067x012.pdf on Jan. 15, 2016, 32 pages.

Emerson Process Management, "Pressure Regulators," 2014, Retrieved at www.documentation.emersonprocess.com/groups/public,/documents/bulletins/0002en_fl_bul.pdf on Jan. 15, 2016, 20 pages.

International Searching Authority, "International Search Report and Written Opinion," issued in connection with PCT Application No. PCT/2017/013369, dated Apr. 13, 2017, 15 pages.

International Searching Authority, "Invitation to Pay Additional Fees and, Where Applicable, Protest Fees", issued in connection with International Patent Application No. PCT/US2017/068081, dated Mar. 9, 2018, 12 pages.

International Searching Authority, "International Search Report and Written Opinion," issued in connectio with International Patent Application No. PCT/US2017/068081, dated May 4, 2018, 19 pages.

United States Patent and Trademark Office, "Non-Final Office Action", issued in connection with U.S. Appl. No. 14/996,990, dated Jul. 21, 2016, 19 pages.

United States Patent and Trademark Office, "Notice of Allowance", issued in connection with U.S. Appl. No. 14/996,990, dated Sep. 15, 2016, 12 pages.

United States Patent and Trademark Office, "Non-Final Office Action," issued in connection with U.S. Appl. No. 14/997,052, dated Jan. 23, 2017, 30 pages.

United States Patent and Trademark Office, "Notice of Allowance and Fee(s) Due," issued in connection with U.S. Appl. No. 14/997,052, dated Apr. 19, 2017, 18 pages.

United States Patent and Trademark Office, "Non-Final Office Action," issued in connection with U.S. Appl. No. 15/395,227, dated Jul. 10, 2018, 50 pages.

United States Patent and Trademark Office, "Notice of Allowance and Fee(s) Due," issued in connection with U.S. Appl. No. 15/395,227, dated Oct. 3, 2018, 16 pages.

United States Patent and Trademark Office, "Corrected Notice of Allowability," issued in connection with U.S. Appl. No. 15/395,227, dated Oct. 29, 2018, 14 pages.

\* cited by examiner

NOISE ATTENUATORS FOR USE WITH PROCESS CONTROL DEVICES

RELATED APPLICATION

This patent arises from a divisional of U.S. application Ser. No. 15/395,227, titled "Noise Attenuators For Use With Process Control Devices," filed Dec. 30, 2016, which is hereby incorporated by this reference in its entirety.

FIELD OF THE DISCLOSURE

This disclosure relates generally to noise attenuators and, more particularly, to noise attenuators for use with process control devices.

BACKGROUND

Fluid valves, regulators and other process control devices are commonly distributed throughout process control systems and/or fluid distribution systems to control flow rates and/or pressures of various fluids (e.g., liquids, gases, etc.). Process control devices may be used to change a characteristic of a fluid such as a pressure, a temperature, a flow rate, etc. This change in a characteristic of the fluid often causes a significant amount of audible noise. For instance, fluid regulators are typically used to reduce and/or regulate a pressure of fluid to a predetermined value. Some fluid regulators reduce an inlet pressure to a lower outlet pressure by restricting flow through an orifice to match a downstream demand. However, fluid flowing through the pressure regulators creates a significant amount of audible noise.

SUMMARY

An example apparatus disclosed herein includes a first plate and a second plate disposed in a fluid passageway of a noise attenuator. The second plate is spaced apart from the first plate. The example apparatus also includes a first support rod extending along a central axis of the fluid passageway. The first support rod is coupled to the first plate and to the second plate. The example apparatus further includes a second support rod extending along an axis parallel to and offset from the central axis. The second support rod is coupled to the first plate and the second plate.

Another example apparatus disclosed herein includes a first plate, a second plate and a third plate spaced apart from each other in a fluid passageway of a noise attenuator, a first set of support rods coupled between the first plate and the second plate and a second set of support rods coupled between the second plate and the third plate. The support rods of the second set are aligned along respective axes offset from the support rods of the first set.

Another example apparatus disclosed herein includes a first plate and a second plate disposed in a fluid passageway of a noise attenuator. The second plate is spaced apart from the first plate. The example apparatus also includes a first support rod extending through centers of the first and second plates. The first and second plates are coupled to the first support rod. The example apparatus further includes a second support rod coupled to peripheral portions of the first and second plates. The second support rod is parallel to and spaced apart from the first support rod.

Another example apparatus disclosed herein includes a noise attenuator body having a fluid passageway between and inlet and an outlet, a support rod extending along a central axis of the fluid passageway and a plate coupled to the support rod and disposed in the fluid passageway. The plate is curved such that a concave side of the plate faces the inlet.

Figure 1:
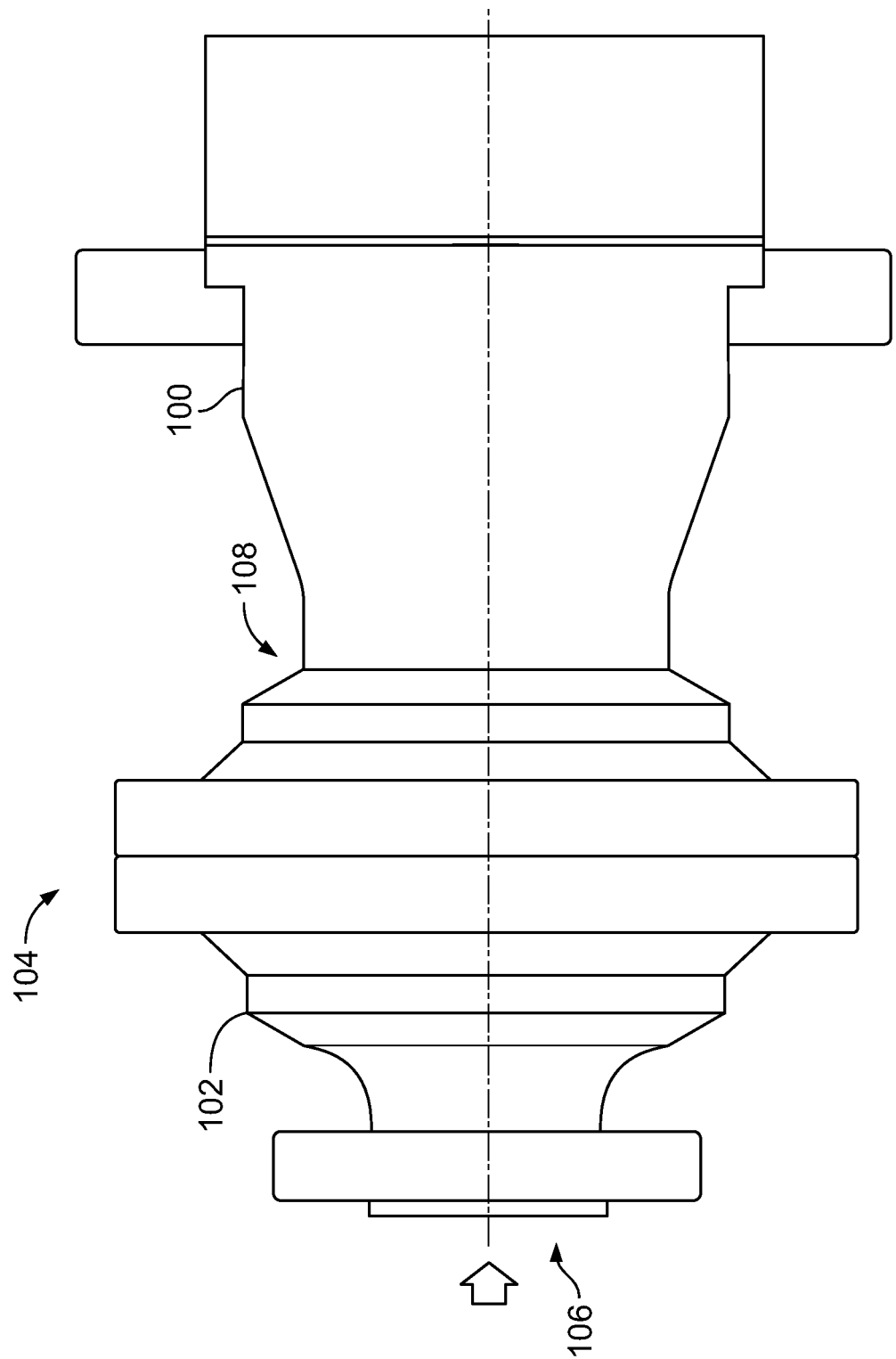
FIG. 1 is a side view of an example noise attenuator implemented in an example regulator assembly and constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Many known process control and/or fluid distribution systems (e.g., power generation systems, petroleum refinery systems, etc.) employ process control devices or field devices to affect the flow of fluid. For example, pressure regulators are used to control flow rates and/or pressures of various fluids (e.g., liquids, gases, etc.). For instance, fluid regulators may be utilized within process control and/or fluid distribution systems to reduce and/or regulate a fluid pressure to a substantially constant value. Known pressure regulators include an inlet that receives fluid from a source at a relatively high pressure and an outlet that provides fluid to downstream equipment at a relatively lower pressure than that of the inlet. The inlet pressure of some known pressure regulators is reduced to a lower outlet pressure by restricting flow through an orifice to match a downstream demand. For example, known pressure regulators of process control and/or fluid distribution systems receive fluid (e.g., gas, liquid) having a relatively high and somewhat variable pressure from an upstream source and regulate the fluid flow to reduce and/or stabilize the pressure to a level suitable for use by downstream equipment (e.g., equipment of a power generator, a petroleum refiner, etc.).

In some instances, the process control devices affect the flow of fluid in a manner that creates audible noise. For example, pressure regulators produce a substantial decrease in pressure or flow rate of the fluid, which, in turn, creates a significant amount of audible noise (e.g., greater than about 85 decibels). Pressure regulators may employ noise attenuators or noise-reduction devices to reduce the level of audible noise created by the fluid flowing through the pressure regulator.

Example noise attenuators described herein include a series of plates or discs disposed in a fluid passageway to induce pressure drops along a flow path through the fluid passageway. The plates include openings (e.g., holes, apertures) that define fluid flow paths through the plates and, thus, through the fluid passageway. As the fluid passes through each of the plates, the pressure of the fluid is incrementally reduced (e.g., by a discrete amount, by a percentage of the previous fluid pressure) along a flow path. The pressure drops induced by the plates result in a corresponding reduction or attenuation of noise (e.g., by a discrete decibel level, by a percentage of the decibel level otherwise produced by the pressure regulator).

Some known noise attenuators include a central rod that extends along a center of the passageway and is coupled to each of the plates to support the plates in the fluid passageway. The central rod extends through the centers of the plates and holds the plates in a perpendicular orientation relative to the flow path. However, fluid flowing through the noise attenuator applies a force on peripheral portions of the plates. This force creates a high bending stress at or near the center of each of the plates where the plate is supported by the central rod. If the pressure drop across a plate increases beyond a threshold, the plate may yield. This force, especially with higher pressure drops and/or flow rates, also causes the peripheral portions to bend, deflect, rotate and/or otherwise move away from a wall of the fluid passageway (e.g., in a downstream direction), thereby reducing an amount of noise attenuation provided by the plates. Some known noise attenuators utilize two of the plates to form a spring barrel containing a plurality of springs to reduce noise. If the plates are moved or bent away from their original position, the springs may become dislodged and travel down the fluid passageway (and, in some instances, around the downstream plates that are also bent or moved away from the wall of the passageway). The springs can cause significant damage and/or negatively affect any downstream devices or equipment.

Disclosed herein are example noise attenuators having a central support rod and one or more additional support rods (e.g., secondary or auxiliary support rods) coupled between adjacent plates to increase the support provided to the plates. The additional rods reduce or eliminate bending and deforming in the plates while maintaining an amount of noise attenuation provided by the plates. The example noise attenuators reduce unacceptable high noise levels (e.g., greater than about 85 decibels) produced by process control devices (e.g., pressure regulators) in fluid communication with the example noise attenuators to more acceptable low noise levels (e.g., less than about 85 decibels).

An example noise attenuator disclosed herein includes a body having a fluid passageway between an inlet and an outlet. The example noise attenuator includes plates (e.g., attenuators, suppressors, etc.) disposed in the fluid passageway and spaced apart from each other along the fluid passageway (e.g., along a central axis of the fluid passageway). A central support rod extends along a central axis of the passageway and is coupled to each of the plates. To increase the structural support of the plates, the example noise attenuator includes support rods coupled between adjacent plates that are offset or spaced apart from the central support rod. The support rods may be positioned at or near peripheral portions (e.g., a first peripheral portion, a second peripheral portion) of the respective plates. Thus, the load generated in each plate (e.g., near the peripheral portions) is transferred to the previous or upstream plate.

For example, a first set of support rods may be coupled between a first plate and a second plate that is downstream of the first plate. The first set of support rods are parallel to and spaced apart from central support rod. The first set of support rods may be coupled to the first and second plates at or near peripheral portions of the first and second plates (e.g., closer to a peripheral edge of the first and second plates than the central support rod). As a result, bending forces or stresses induced in the second plate are transferred (via the first set of support rods) to the first plate. In some examples, the peripheral portion (e.g., an outer edge) of the first plate is coupled to the wall of the passageway. For example, the peripheral portion (e.g., at or near an outer edge of the first plate) may be engaged with a ledge formed in the wall of the passageway. The ledge prevents the peripheral portion of the first plate from moving or bending in the downstream direction. Thus, the load generated by the second plate (and/or subsequent plates) is transferred back to the first plate and distributed to the ledge of the wall in the passageway. In some examples, relatively thin or narrow support rods may be implemented, which have a minimal impact on the flow area.

In some examples, the noise attenuator includes a third plate downstream of the second plate, and a second set of support rods is coupled between the second plate and the third plate. The second set of support rods may be positioned at or near peripheral portions of the second and third plates. Thus, the first set of support rods extend between the first and second plates, and the second set of support rods extend between the second and third plates. As a result, bending forces or stresses induced in the third plate are transferred (via the second set of support rods) back to the second plate and, thus, and transferred back to the first plate as described above. In some examples, the second set of support rods are aligned or oriented along axes that are offset from the first set of support rods. Some example noise attenuators include more than three plates. Similar to the first and second sets of support rods, each set of support rods may be offset from the support rods of the previous and/or subsequent sets (e.g., upstream and downstream). In other examples, one or more of the support rods may extend between more than two plates.

Because the example support rods disclosed herein are coupled between adjacent plates and spaced apart from the central support rod (e.g., the support rods are coupled to the peripheral portions of the respective plates), the support rods deter and/or prevent the peripheral portions of the plates from bending and/or deforming away from the wall of the fluid passageway when forces are applied to the peripheral portions as a result of fluid flowing through the fluid passageway. Thus, the support rods increase and/or maintain an amount of noise attenuation provided by the plates. In some examples, the support rods are spaced equidistantly around the peripheral portions of the plates to more evenly distribute stress and/or strain in the plates that result from the fluid flow acting on the plates and, thus, reduce a likelihood of the plates breaking, bending, and/or otherwise failing over time. In some examples, the support rods are arranged in a pattern or equidistant arrangement (e.g., a ring around the central support rod, a matrix of rows and columns, etc.) around the plates.

In some examples, the support rods extend through openings defined in the plates to couple the plates together. For example, a first set of support rods may extend through openings in a first plate and through openings in a second plate downstream of the first plate. The openings of the first and second plates align, which enables the support rods to extend in a direction parallel to the central axis of the fluid passageway (e.g., parallel to the central support rod) and further increase the structural support the support rods provide to the plates. In some examples, the support rods are threaded, and threaded fasteners (e.g., nuts) are coupled to the support rods to maintain the plates in position. For example, an end of one of the support rods may extend through the second plate, and a threaded fastener may be threadably coupled to the end of the support rod on a side of the second plate facing downstream (e.g., toward the outlet) in the fluid passageway. In some examples, the opposite end of the support rod extends through the first plate, and a threaded fastener may be threadably coupled to the support rod on a side of the first plate that facing upstream (e.g., toward the inlet) in the fluid passageway. As such, bending forces or stresses in the second plate (acting in the downstream direction) are transferred, via the support rod, to the first plate. This example arrangement may likewise be implemented with any subsequent plates downstream of the second plate.

In some examples, the fluid passageway tapers outwardly (e.g., diverges) toward the outlet of fluid passageway to reduce fluid pressure within the fluid passageway and, thus, increase noise attenuation produced by the noise attenuator. In some examples, to enable the plates to be positioned along the fluid passageway and adjacent the tapered wall of the fluid passageway, the plates have different diameters such that a plate closer to the outlet has a larger diameter than a plate further from the outlet.

Also disclosed herein are example noise attenuators having one or more curved plates (e.g., concave plates). An example noise attenuator includes a plate disposed in a passageway between an inlet and an outlet. A central support rod extends along a central axis of the fluid passageway and is coupled to the plate to retain the plate in the fluid passageway. The plate is curved such that a concave side of the plate faces the inlet (e.g., upstream) and a convex side of the plate faces the outlet (e.g., downstream). As such, the peripheral portions of the plate are biased or preloaded toward the upstream direction. Thus, any bending forces or stresses acting on the plate have minimal effect on the plate. In some examples, an outer edge of the curved plate is engaged with a wall of the passageway. In some examples, a diameter of the plate in a flattened orientation (e.g., an effective diameter) is larger than a diameter of the fluid passageway. As a result, if the fluid flow induces forces on the peripheral portion of the plate, the outer edge of the plate is pressed into engagement with the wall of the fluid passageway, thereby preventing any bending or movement of the plate. Further, at least part of the load is transferred away from the central support rod and to the wall of the fluid passageway. In some examples, two curved plates are implemented. In some examples, the curved plates are implemented with the support rods disclosed above. The example noise attenuators disclosed herein achieve increased structural integrity. Thus, the example noise attenuators can be used in process control and/or fluid distribution systems having relatively high flow rates or pressures.

The example noise attenuators disclosed herein may be coupled to an outlet of a process control device, such as a pressure regulator, to reduce or suppress the noise created by the flow of fluid through the process control device. In some examples, the example noise attenuators are integrated into the process control device (e.g., within a housing or body of the process control device). For example, the example noise attenuators may replace an outlet flange of a pressure regulator. In other examples, the noise attenuators may be separate from the process control device that created the audible noise and/or otherwise disposed downstream of the process control device.

FIG. 1 illustrates an example noise attenuator 100 constructed in accordance with the teachings of this disclosure.

The example noise attenuator 100 may be used to reduce noise levels in a process control system and/or fluid distribution system. The example noise attenuator 100 may be coupled to, for example, an outlet of a process control device to reduce the noise created by the flow of fluid exiting the process control device. In the illustrated example of FIG. 1, the noise attenuator 100 is coupled to a fluid regulator 102 (e.g., a pressure regulator) as part of a fluid regulator assembly 104. However, in other examples, the noise attenuator 100 may be coupled to and/or otherwise integrated with any other type of process control device (e.g., a valve) and/or any other device that changes a characteristic of a fluid and creates noise. In the illustrated example, the fluid regulator assembly 104 is to process a fluid (e.g., natural gas, air, propane, nitrogen, hydrogen, carbon dioxide, etc.) through a passageway of the fluid regulator 102 between a regulator inlet 106 and a regulator outlet 108. The regulator inlet 106 of the illustrated example is capable of receiving a fluid at a relatively high pressure (e.g., between approximately 1200 psi and 1800 psi) from an upstream source and reduces the pressure of the fluid at the regulator outlet 108 (e.g., down to about 10 psi) based on a predetermined or preset setting. Due to relatively large pressure drops of the fluid as the fluid flows between the regulator inlet 106 and the regulator outlet 108 and/or relatively high velocity fluid flow rate of the fluid exiting the regulator outlet 108, the fluid may generate unacceptable noise levels (e.g., greater than 85 decibels). The example noise attenuator 100 is in fluid communication with the regulator outlet 108 and reduces the noise levels produced by the fluid regulator 102 to an acceptable noise level (e.g., lower than 85 decibels). The fluid exits the regulator outlet 108 and flows through the noise attenuator 100 to a downstream source (e.g., a pipe).

Figure 2A:
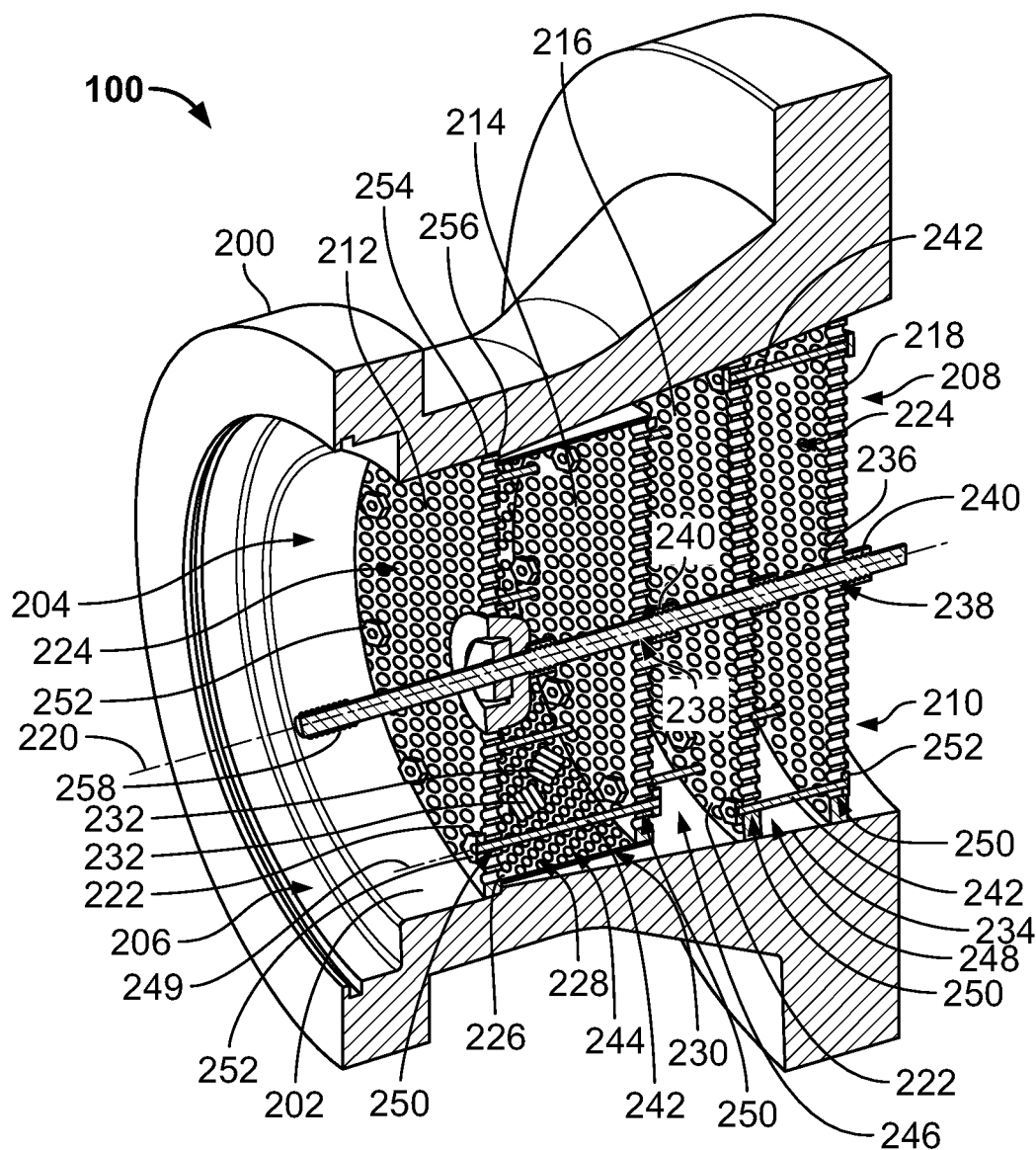
FIG. 2A is a perspective cross-sectional view of the example noise attenuator of FIG. 1.
Figure 2B:
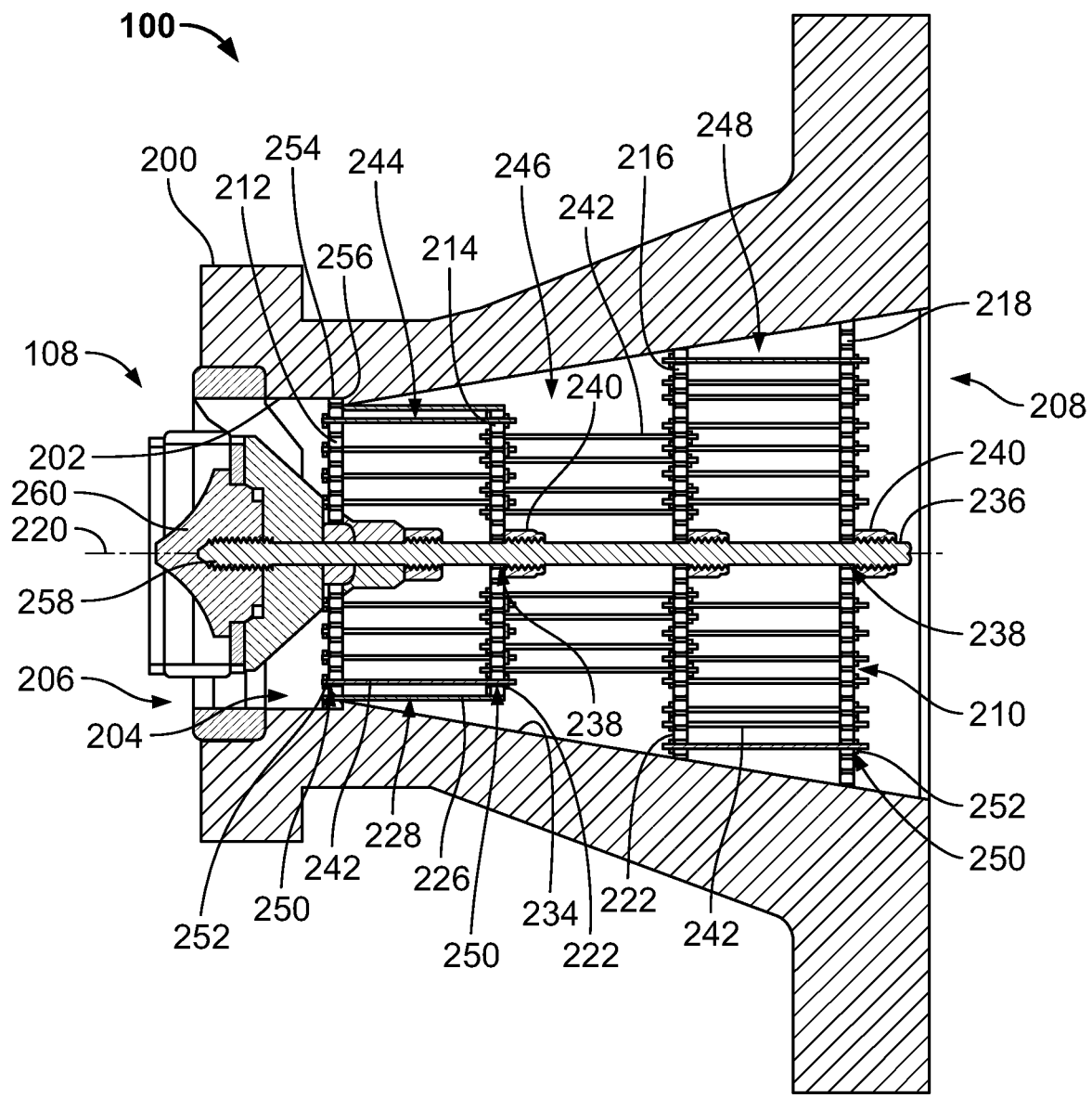
FIG. 2B is a side cross-sectional view of the example noise attenuator of FIG. 1.

FIGS. 2A and 2B illustrate cross-sectional views of the example noise attenuator 100. In particular, FIG. 2A is a perspective cross-sectional view of the example noise attenuator 100 and FIG. 2B is a side cross-sectional view of the example noise attenuator 100 as coupled to the regulator outlet 108. In the illustrated example of FIGS. 2A and 2B, the noise attenuator 100 includes a body 200 with a wall 202 (e.g., an inner wall) defining a fluid passageway 204 between an inlet 206 and an outlet 208 and a noise-attenuation assembly 210 (e.g., a noise-abatement assembly) disposed in the fluid passageway 204. The noise-attenuation assembly 210 includes one or more structure(s) to reduce noise of fluid flowing through the fluid passageway 204. In the illustrated example, the noise-attenuation assembly 210 includes a first plate 212 (e.g., a noise attenuator or suppressor), a second plate 214, a third plate 216 and a fourth plate 218 disposed in the fluid passageway 204 between the inlet 206 and the outlet 208. In other examples, the noise-attenuation assembly 210 may include more or fewer plates (e.g., one plate, two plates, five plates, eight plates, etc.). In some examples, the first, second, third and/or fourth plates 212, 214, 216, 218 are constructed of a metallic material such as steel. In other examples, the first, second, third and/or fourth plates 212, 214, 216, 218 may be constructed of other suitable materials.

In the illustrated example, the first, second, third and fourth plates 212, 214, 216, 218 (referred to herein as "the plates 212-218") are spaced apart from each other along a central axis 220 (e.g., a longitudinal axis) of the fluid passageway 204. The first plate 212 is disposed in a first position in the fluid passageway 204, the second plate 214 is disposed in a second position in the fluid passageway 204 downstream of the first position, the third plate 216 is disposed in a third position in the fluid passageway 204 downstream of the second positon, and the fourth plate 218 is disposed in a fourth position in the fluid passageway 204 downstream of the third position. In the illustrated example, the plates 212-218 are perpendicular to the central axis 220 of the fluid passageway 204. Each of the plates 212-218 has a peripheral portion 222 (e.g., an outer edge or area near the outer edge of the plates 212-218) that is adjacent and/or engages a portion of the wall 202 defining the fluid passageway 204. The distances between adjacent ones of the plates 212-218 may be the same distance or different distances. For example, the distance between the first and second plates 212, 214 may be two inches, and the distance between the third and fourth plates 216, 218 may be four inches.

As illustrated in FIG. 2A, the plates 212-218 include openings 224 (e.g., apertures, perforations, etc.) that define fluid pathways through the plates 212-218 and, thus, through the fluid passageway 204. In the illustrated example, the openings 224 are arranged in a continuous or repeating pattern in which the openings 224 are equidistant from each other. In other examples, the openings 224 may be disposed in other configurations. Fluid is to flow from an upstream source (e.g., from the regulator outlet 108) into the inlet 206, through the plates 212-218 in the fluid passageway 204, and through the outlet 208 to a downstream source (e.g., a pipe). The plates 212-218 induce incremental pressure drops in the flowing fluid, which slows the fluid and reduces noise caused by the flowing fluid.

In the illustrated example of FIGS. 2A and 2B, the first plate 212 and the second plate 214 form a spring barrel. In particular, the first plate 212 and the second plate 214 are coupled by a cylindrical wall 226 and define a cavity 228 (e.g., a barrel, a cage). As illustrated in FIG. 2A, the cylindrical wall 226 includes a plurality of openings 230 defining fluid pathways through the cylindrical wall 226. In the illustrated example, the cavity 228 houses one or more springs 232. Two springs 232 (e.g., coils) are depicted in FIG. 2A. However, any number of springs (e.g., hundreds or thousands) may be disposed within the cavity 228. In some examples, the springs 232 are packed relatively tightly within the cavity 228, such that movement of the springs 232 is minimal. The springs 232 form fluid pathways that slow the flow of fluid through the cavity 228 and reduce the noise of the flowing fluid. In other examples, different shaped structures (e.g., metal balls) may be disposed in the cavity 228 in addition to or as an alternative to the springs 232. The combination of the springs 232 disposed in the cavity 228, the openings 224 in the plates 212-218 and the openings 230 in the cylindrical wall 226 dissipate energy of fluid flowing through the fluid passageway 204 and, thus, reduce audible noise levels resulting from the process control device (e.g., the fluid regulator 102 (FIG. 1)). In other examples, the first and second plates 212, 214 may not form a spring barrel. Additionally or alternatively, in other examples, a spring barrel may be defined by subsequent plates downstream of the first and/or second plates 212, 214.

In the illustrated example of FIGS. 2A and 2B, the plates 212-218 are disposed within a tapered portion 234 of the fluid passageway 204. A cross-section or an opening size (e.g., a diameter) of the tapered portion 234 expands or increases between the inlet 206 and the outlet 208. In other words, at least a portion of the fluid passageway 204 (e.g., the tapered portion 234) is angled or tapered between the inlet 206 and the outlet 208. This diverging shape of the fluid passageway 204 enables the fluid to expand and decrease in velocity to dissipate energy of the fluid flow and/or to reduce noise. In some examples, the diameter of the outlet 208 is twice (or more than) the diameter of the inlet 206. In other example, the diameter of the outlet 208 may be larger than the diameter of the inlet 206 by a different factor (e.g., 1.5×, 2.5×, etc.). In other examples, the cross-sectional area and/or opening size of the fluid passageway 204 of the example noise attenuator 100 may be substantially constant.

To enable the plates 212-218 to engage and/or be adjacent the wall 202 of the tapered portion 234, the plates 212-218 have different diameters that substantially correspond to the diameter of the tapered portion 234 at which the plates 212-218 are positioned. For example, the fourth plate 218 is closest to the outlet 208 of the fluid passageway 204 and has a larger diameter than the diameter of the third plate 216, which has a larger diameter than the diameters of the first and second plates 212, 214. In the illustrated example, the diameters of the first and second plates 212, 214 are substantially the same. As such, a gap is formed between the cylindrical wall 226 and the wall 202 and between the second plate 214 and the wall 202. In other examples, the second plate 214 has a larger diameter than the first plate 212 and may be closer the wall 202.

In operation, the noise attenuator 100 reduces audible noise caused by high energy fluid flowing through a fluid passageway of a process control device (e.g., the fluid regulator 102 of FIG. 1) and/or the fluid passageway 204 of the noise attenuator 100 of a fluid regulator assembly (e.g., the fluid regulator assembly 104 of FIG. 1). For example, as the fluid exits an outlet (e.g., the regulator outlet 108 of FIG. 1) of a process control device and passes between the inlet 206 and the outlet 208 of the noise attenuator 100, the fluid flows through the noise-attenuation assembly 210 and/or gradually expands in the fluid passageway 204 to dissipate energy of the fluid and, thus, attenuate, reduce, abate and/or otherwise suppress audible noise. For example, as the fluid flows past each of the plates 212-218 and/or along the tapered portion 234 of the fluid passageway 204, the pressure and/or velocity of the fluid is reduced, thereby providing a staged or incremental reduction or dissipation of energy of the fluid exiting the regulator.

To position and space apart the plates 212-218 within the fluid passageway 204, the example noise-attenuation assembly 210 includes a central support rod 236. The plates 212-218 are coupled to and spaced along the central support rod 236 in the fluid passageway 204. The central support rod 236 disposes the plates 212-218 in the respective, first, second, third and fourth positions in the fluid passageway 204. In the illustrated example, the central support rod 236 extends along (e.g., is aligned with) the central axis 220 (e.g., the longitudinal axis of the central support rod 236 is coincident with the central axis 220). In the illustrated example, the central support rod 236 extends through the centers of each of the plates 212-218. In particular, each of the plates 212-218 has a central support rod opening 238 in the centers of the respective plates 212-218. The central support rod 236 extends through the central support rod openings 238 in the plates 212-218.

To couple the plates 212-218 to the central support rod 236, the central support rod 236 is threaded or at least partially threaded (e.g., the portions upstream and/or downstream of each of the plates 212-218 are threaded). Threaded fasteners 240 (e.g., nuts) threadably couple to the central support rod 236 to retain the plates 212-218 in their respective positions in the fluid passageway 204. In some examples, the threaded fasteners 240 engage the plates 212-218 and press (e.g., bias) the plates 212-218 against the wall 202 in the fluid passageway 204 to maintain a seal. In the illustrated example, the threaded fasteners 240 are disposed on the central support rod 236 on the downstream sides of the plates 212-218 (e.g., the sides facing the outlet 208), which keeps the plates 212-218 from being pushed downstream by the fluid flow. In some examples, one or more fastener(s) may be implemented on the upstream sides of the plates 212-218 (e.g., the sides facing the inlet 206) to retain the plates 212-218 in their positions. Additionally or alternatively, in other examples, the plates 212-218 may be coupled to the central support rod 236 via other chemical and/or mechanical fastening techniques. For example, one or more of the plates 212-218 may be welded to the central support rod 236.

As mentioned above, as the pressure differential across the plates 212-218 increases, the forces acting on the plates 212-218 increase. In particular, bending forces or stresses are induced in the peripheral portions 220 of the plates 212-218. To reduce bending and deformation of the plates 212-218, the example noise-attenuation assembly 210 includes one or more support rods 242 (e.g., secondary support rods, auxiliary support rods) coupled between adjacent ones of the plates 212-218. For example, a first set 244 of the support rods 242 are coupled between the first and second plates 212, 214; a second set 246 of the support rods 242 are coupled between the second and third plates 214, 216; and a third set 248 of the support rods 242 are coupled between the third and fourth plates 216, 218. In the illustrated example, the support rods 242 are coupled to (e.g., positioned at) or near the peripheral portions 222 of the plates 212-218. The support rods 242 distribute the support load along the peripheral or outer areas of the plates 212-218. Thus, unlike known noise attenuators that only have a central support rod, the plates 212-218 are subjected to less bending and stress because the loads are distributed more evenly across the respective plates 212-218.

To couple the support rods 242 to the plates 212-218, the support rods 242 extend through support rod openings 250 in the plates and threaded fasteners 252 (e.g., nuts) are coupled to or near ends of the support rods 242. In other words, the ends of the support rods 242 extend through the respective plates 212-218. In some examples, only the ends of the support rods 242 are threaded. In other examples, the entire length of the support rods 242 may be threaded. The support rod openings 250 in each of the plates 212-218 align with the support rod openings 250 in the previous and/or subsequent plates 212-218. For example, the support rod openings 250 in the first plate 212 for the first set 244 of the support rods 242 align with the corresponding support rod openings 250 in the second plate 214 for the first set 244 of the support rods 242. Additionally, the support rod openings 250 in the second plate 214 for the second set 246 of the support rods 242 align with the corresponding support rod openings 250 in the third plate 216 for the second set 246 of the support rods 242, and so forth. In some examples, the openings 224 may be implemented as the support rod openings 250.

In the illustrated example of FIGS. 2A and 2B, the support rods 242 are aligned or oriented along axes that are parallel to and offset from the central axis 220 (e.g., the longitudinal axis of the central support rod 236) in the fluid passageway 204. For example, an axis 249 of one of the support rods 242 of the first set 244 is illustrated in FIG. 2A. The support rod 242 extends along the axis 249, which is parallel to and offset from the central axis 220. As such, the support rods 242 are oriented substantially parallel to and spaced from the central support rod 236. In the illustrated example, the support rods 242 extend perpendicularly relative to the plates 212-218, which increases an amount of structural support provided by the support rods 242 to the plates 212-218. In some examples, the support rods 242 have a relatively small diameter (e.g., a diameter smaller than the central support rod 236). As a result, the support rods 242 cause minimal interference with the flow of fluid through the fluid passageway 204.

In the illustrated example, the threaded fasteners 252 coupled to the first set 244 of the support rods 242 are coupled to the ends of the first set 244 of the support rods 242 on the upstream side of the first plate 212 (i.e., the side of the first plate 212 facing upstream or toward the inlet 206) and the downstream side of the second plate 214 (i.e., the side of the second plate 214 facing downstream or toward the outlet 208). In this manner, the support rods 242 of the first set 244 transfer bending forces or stresses in the second plate 214 to the first plate 212 and prevent or substantially reduce bending or moving of the second plate 214 (e.g., the peripheral portion 222) toward the outlet 208 by the fluid flowing through the fluid passageway 204. Likewise, the threaded fasteners 252 coupled to the second set 246 of the support rods 242 are coupled to the ends of the second set 246 of the support rods 242 on the upstream side of the second plate 214 and the downstream side of the third plate 216. Thus, the support rods 242 of the second set 246 transfer bending forces or stresses in the third plate 216 to the second plate 214 and prevent or substantially reduce bending of the third plate 216 toward the outlet 208. Similarly, the threaded fasteners 252 coupled to the third set 248 of the support rods 242 are coupled to the ends of the third set 248 of the support rods 242 on the upstream side of the third plate 216 and the downstream side of the fourth plate 218. Thus, the support rods 242 of the third set 248 transfer bending forces or stresses in the fourth plate 218 to the third plate 216 and prevent or substantially reduce bending of the fourth plate 218 toward the outlet 208. Therefore, bending forces and stresses in each of the plates 212-218 are transferred to the previous plate and, thus, to the first plate 212 (e.g., the plate furthest upstream). Additionally or alternatively, in other examples, the support rods 242 may be coupled to the plates 212-218 via other chemical and/or mechanical fastening techniques. The central support rod 236 and/or the support rods 242 fixedly position the plates 212-218 in the respective, first, second, third and fourth positions in the fluid passageway 204.

In the illustrated example of FIGS. 2A and 2B, the support rods 242 of the first set 244 are offset from the support rods 242 of the second set 246, which are offset from the support rods 242 of the third set 248. In other words, the support rods 242 between the first and second plates 212, 214 (the first set 244) are aligned along axes that are offset from the axes of the support rods 242 between the second and third plates 214, 216 (the second set 246); and the axes of the support rods 242 between the second and third plates 214, 216 (the second set 246) are offset from the axes of the support rods 242 between the third and fourth plates 216, 218 (the third set 248).

In some examples, to distribute the load generated in the peripheral portion 222 of the first plate 212 (e.g., as caused by the downstream plates), the peripheral portion 222 of the first plate 212 is coupled to the wall 202 of the fluid passageway 204. For example, in the illustrated example of FIGS. 2A and 2B, a peripheral edge 254 (e.g., an outer edge) or portion of the first plate 212 near the peripheral edge 254 is engaged with a ledge 256 (e.g., a lip) formed in the wall 202 of the fluid passageway 204. This engagement prevents the peripheral portion 222 of the first plate from bending or moving and distributes the load induced in the first plate 212 by the other plates and/or the flowing fluid. Additionally or alternatively, in other examples, the first plate 212 may be coupled to the wall 202 of the fluid passageway 204 via other chemical and/or mechanical fastening techniques. For example, the peripheral edge 254 of the first plate 212 may be welded to the wall 202 of the fluid passageway 204.

In the illustrated example, the first, second and third sets 244, 246, 248 of the support rods 242 are arranged in patterns around the central axis 220 (e.g., around the central support rod 236). In particular, as illustrated in FIG. 2A, the support rods 242 of the first set 242 are located equidistantly about the peripheral portion 222 of the first plate 212 (e.g., in a ring-shaped pattern), which improves distribution of stresses and/or strains throughout the first plate 212. For example, the support rods 242 of the first set 244 are spaced apart equidistantly from each other by about 60 degrees relative the central axis 220 of the fluid passageway 204 along the peripheral portion 222 of the first plate 212. The positioning of the support rods 242 deters and/or prevents the peripheral portion 222 from bending, deforming, rotating and/or otherwise moving away from the wall 202 when a force is applied from fluid flow and, thus, maintains an amount of noise attenuation (e.g., noise reduction, noise abatement, noise suppression) provided by the noise-attenuation assembly 210 of the noise attenuator 100. In other examples, the support rods 242 are non-equidistantly spaced and/or are spaced apart by angles greater than or less than 60 degrees. In other words, the support rods 242 of the first set 244 may be closer to or further from each other and/or the central axis 220. In other examples, the support rods 242 may be arranged in other patterns or configurations and/or otherwise disposed in different locations. For example, the support rods 242 of the first set 244 may be disposed in a pattern of multiple rings around the central axis 220. As another example, the support rods 242 of the first set 244 may be arranged in a matrix configuration of rows and columns.

In the illustrated example, the first set 244 includes six of the support rods 242. However, in other examples, the first set 244 may include more (e.g., 7, 8, 9, etc.) or fewer (e.g., 5, 4, 3, etc.) support rods. In some examples, only one support rod is coupled between the first and second plates 212, 214. For example, the central support rod 236 (e.g., a first support rod) may extend along the central axis 220 and be coupled to the first and second plates 212, 214, and a second support rod (e.g., one of the support rods 242) may extend along an axis parallel to and offset from the central axis 220 and be coupled to the first and second plates 212, 214. The additional support rod 242 transfers bending forces or stresses to the first plate 212 and prevents or substantially reduces bending or deforming of the peripheral portion 222 of the second plate 214.

As illustrated in FIG. 2A, the second set 246 and the third set 248 of the rods 242 are likewise equidistantly arranged about the central axis 220. However, similar to the first set 244 disclosed above, in other examples, the support rods 242 of the second set 246 and/or the third set 248 may be disposed in other patterns, further or closer to the central axis 220 (e.g., the central support rod 236) and/or otherwise disposed in other locations. Each of the sets 244, 246, 248 may include the same or a different number of the support rods 242.

While in the illustrated example the support rods 242 only extend between two of the plates 212-218, in other examples, one or more of the support rods 242 may extend through and couple to more than two of the plates 212-218. For example, one of the support rods 242 may be coupled to the first, second and third plates 212, 214, 216. Also, while four plates are illustrated, in other example the noise-attenuation assembly 210 may include only two plates such as the third and fourth plates 216, 218. In other examples, the noise-attenuation assembly 210 may include more than four plates.

The example noise-attenuation assembly 210 may be manufactured via metal printing, for example. The plates 212-218, the central support rod 236, the support rods 242, etc. may be printed as a substantially unitary piece or component, which results in less assembly time. In other examples, the plates 212-218, the central support rod 236, the support rods 242, etc. may be printed as multiple pieces and assembled via chemical and/or mechanical fastening techniques. In some examples, the area around each of the support rod openings 238 is thickened to add strength to the plates 212-218 where the support rods 242 are connected to the plates 212-218. In other examples, the plates 212-218 may be printed onto machine components to increase strength. In other examples, the plates 212-218 may be constructed via laser cutting to form the hole patterns (e.g., the openings 224, the central support rod openings 238 and/or the support rod openings 250). In some examples, laser cutting greatly reduces setup, tooling and machining time.

In some examples, to assemble the example noise-attenuation assembly 210, the second, third and fourth plates 214, 216, 218 may be assembled with the central support rod 236 and the first, second and third sets 244, 246, 248 of the support rods 242. The first plate 212 may be inserted into the fluid passageway 204 from the inlet 206 and engaged with the ledge 256. The assembled second, third and fourth plates 214, 216, 218 may be inserted into the fluid passageway 204 via the outlet 208. The support rods 242 of the first set 244 and the central support rod 236 may be inserted through the respective openings in the first plate 212. Fasteners (e.g., the threaded fasteners 240, 252) may then be threadably coupled to the ends of the central support rod 236 and the support rods 242 of the first set 244. In other examples, the noise-attenuation assembly 210 may be assembled in other sequences or manners.

In the illustrated example of FIG. 2A, an end 258 (e.g., the upstream end) of the central support rod 236 is threaded. The central support rod 236 may be threadably coupled to a component in an outlet of a process control device. For example, as illustrated in FIG. 2B, the end 258 of the central support rod 236 may be threadably coupled to a pad retainer 260 in the regulator outlet 108 of the fluid regulator 102 (FIG. 1). In other examples, the noise attenuator 100 may be coupled to a process control device or any other upstream fluid support source (e.g., a pipe) via other chemical and/or mechanical fastening techniques.

Figure 3A:
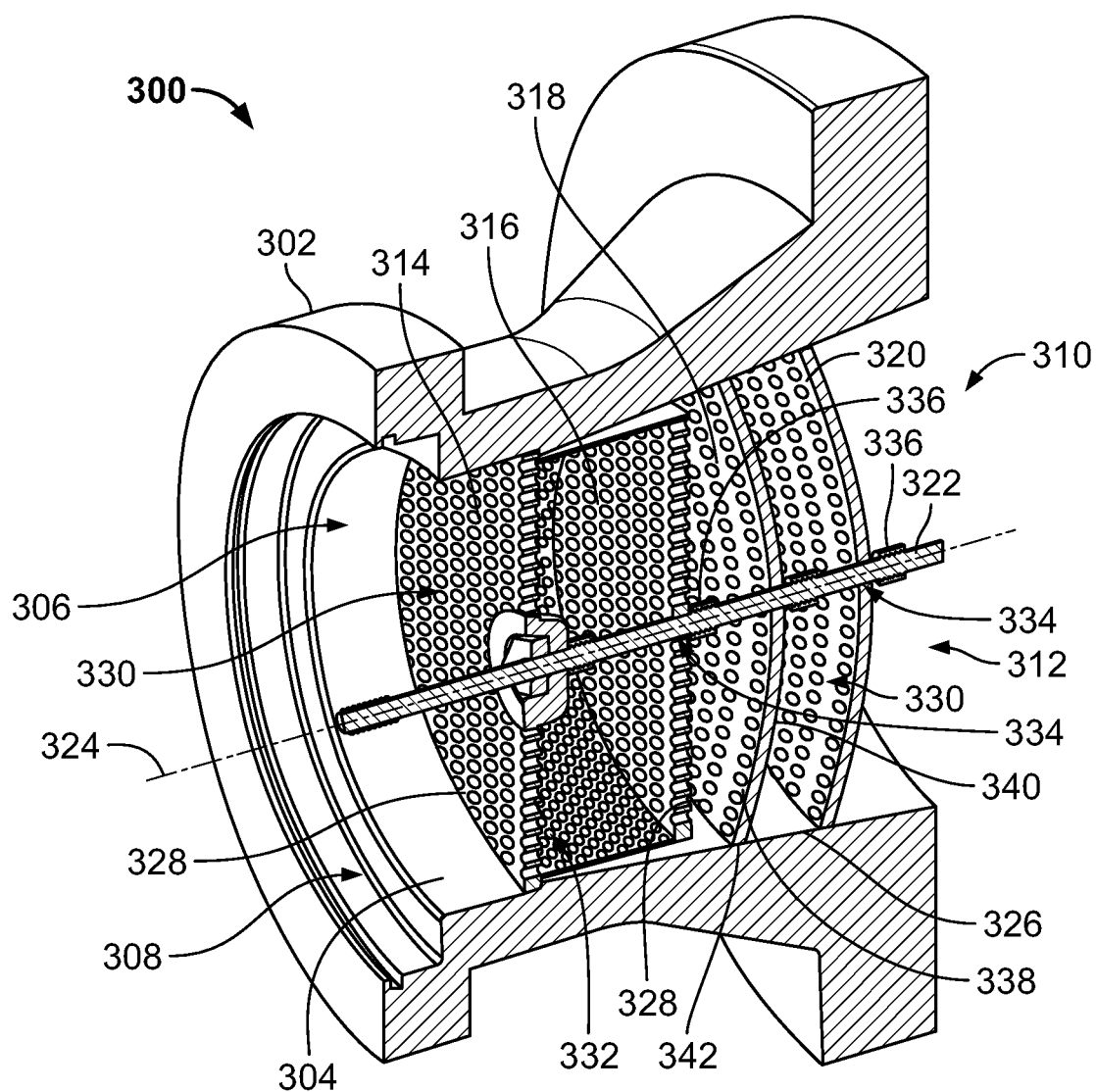
FIG. 3A is a perspective cross-sectional view of another example noise attenuator constructed in accordance with the teachings of this disclosure.
Figure 3B:
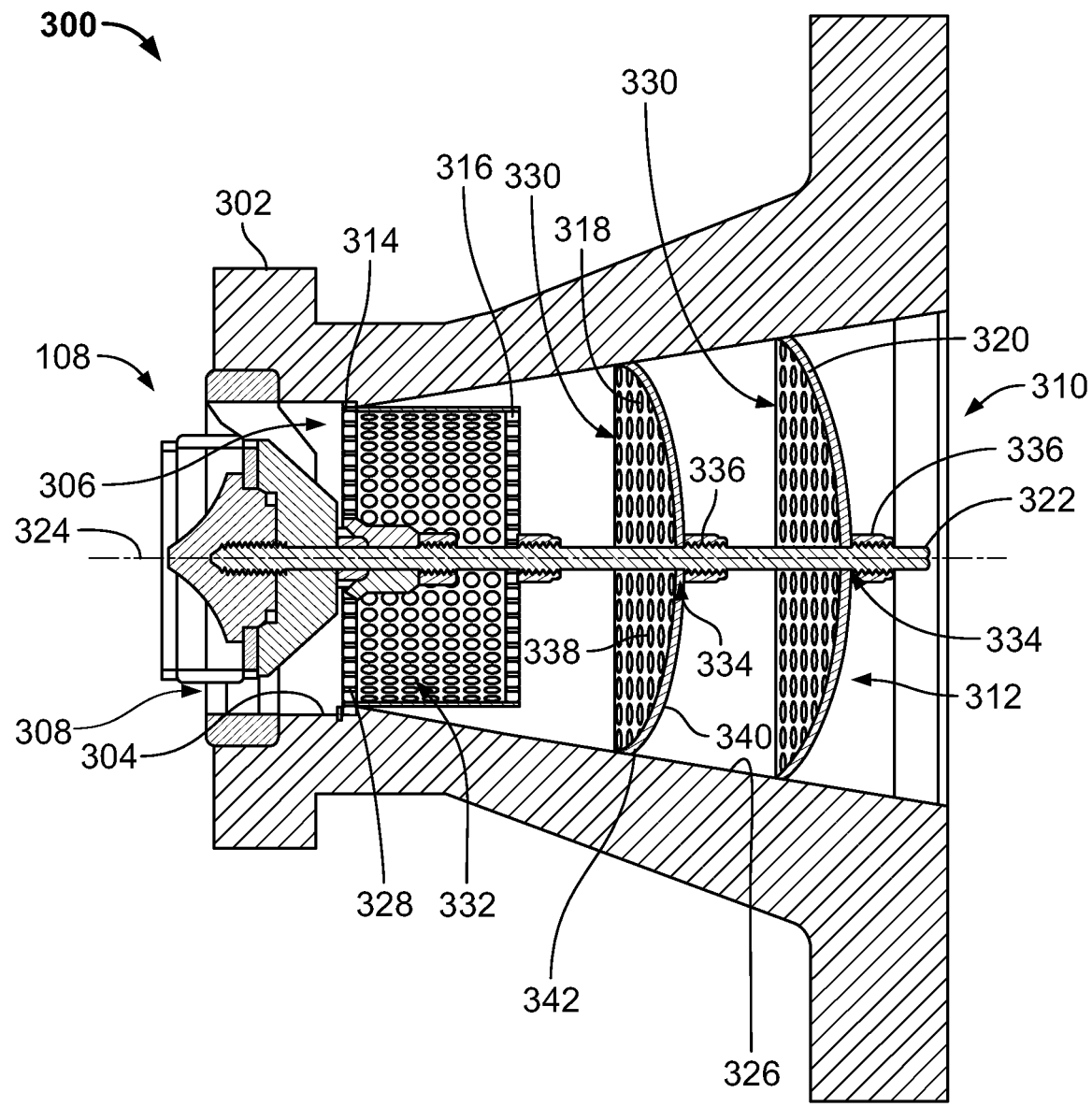
FIG. 3B is a side cross-sectional view of the example noise attenuator of FIG. 3A.

FIGS. 3A and 3B illustrate another example noise attenuator 300 constructed in accordance with the teachings of this disclosure. In particular, FIG. 3A is a perspective cross-sectional view of the example noise attenuator 300 and FIG. 3B is a side cross-sectional view of the example noise attenuator 300 as coupled to the regulator outlet 108 of the fluid regulator 102 (FIG. 1). Similar to the example noise attenuator 100 of FIGS. 1, 2A and 2B, the example noise attenuator 300 of FIGS. 3A and 3B may be implemented with any process control device (e.g., the fluid regulator 102 of FIG. 1) to reduce the noise of fluid exiting the process control device. The example noise attenuator 300 includes a body 302 with a wall 304 (e.g., an inner wall) defining a fluid passageway 306 between an inlet 308 and an outlet 310 and a noise-attenuation assembly 312 (e.g., a noise-abatement assembly) disposed in the fluid passageway 306. In the illustrated example, the noise-attenuation assembly 312 includes a first plate 314, a second plate 316, a third plate 318 and a fourth plate 320 coupled to a central support rod 322 and disposed in the fluid passageway 306 between the inlet 308 and the outlet 310 of the noise attenuator 300. In other examples, the noise-attenuation assembly 312 may include more or fewer plates (e.g., one plate, two plates, five plates, eight plates, etc.). The central support rod 322 is disposed along a central axis 324 of the fluid passageway 306, and the first, second, third and fourth plates 314, 316, 318, 320 (referred to herein as "the plates 314-320") are spaced apart from each other along the central axis 324 (e.g., a longitudinal axis) of the fluid passageway 306. The central support rod 322 disposes the first plate 314 in a first position in the fluid passageway 306, the second plate 316 in a second position in the fluid passageway 306 downstream of the first position, the third plate 318 in a third position in the fluid passageway 306 downstream of the second positon, and the fourth plate 320 in a fourth position in the fluid passageway 306 downstream of the third position.

Similar to the noise attenuator 100 of FIGS. 2A and 2B, the fluid passageway 306 of the noise attenuator 300 of FIGS. 3A and 3B includes a tapered portion 326 that expands or increases between the inlet 308 and the outlet 310. Thus, the plates 314-320 may have different diameters than each other (e.g., the diameter of the fourth plate 320 may be larger than the diameter of the third plate 318, and so forth). Each of the plates 314-320 has a peripheral portion 328 (e.g., an outer edge or area near the outer edge of the plates 314-320) that is adjacent and/or engages a portion of the wall 304 (e.g., the tapered portion 326) defining the fluid passageway 306. For example, the peripheral portions 328 of the third and fourth plates 318, 320 are engaged with the wall 304 of the fluid passageway 306. Each of the plates 314-320 includes openings 330 (e.g., apertures, perforations, etc.) that define fluid pathways through the plates 314-320 and, thus, through the fluid passageway 306. Further, in the illustrated example, the first and second plates 314, 316 form a cavity 332 (e.g., a spring barrel similar to the spring barrel (e.g., the cavity 228) described in connection with FIGS. 2A and 2B). The noise reducing effect(s) achieved by the tapered portion 326, the openings 330 in the plates 314-320 and the cavity 332 (e.g., the spring barrel) are similar to the effect(s) created by the corresponding features in the noise attenuator 100 of FIGS. 2A and 2B and are not repeated again herein.

Similar to the central support rod 236 of FIGS. 2A and 2B, the central support rod 322 of FIGS. 3A and 3B extends through central rod openings 334 in the plates 314-320. Threaded fasteners 336 (e.g., nuts) threadably couple to the central support rod 322 to retain the plates 314-320 in their respective positions in the fluid passageway 306, similar to the threaded fasteners 240 described in connection with FIGS. 2A and 2B.

As mentioned above, as the pressure differential across the plates 314-320 increases, the forces acting on the plates 314-320 increases. In particular, bending forces or stresses are induced in the peripheral portions 328 of the plates 314-320. To reduce bending and deformation of the plates 314-320, one or more of the plates 314-320 may be curved. For example, as illustrated in FIGS. 3A and 3B, the third plate 318 (e.g., a concave plate) is curved such that a concave side 338 of the third plate 318 faces upstream (toward the inlet 308) and a convex side 340 of the third plate 318 faces downstream (toward the outlet 310). Thus, the third plate 318 is pre-loaded or formed in a direction against the flow of fluid and, therefore, the third plate 318 is shaped to resist stresses or loads on the third plate 318 that may otherwise cause the peripheral portion 328 of the third plate 318 to bend or move towards the downstream direction. Further, in the illustrated example, an outer edge 342 of the third plate 318 is engaged with the wall 304 (e.g., along the tapered portion 326). In some examples, the diameter of the third plate 318 in a flattened configuration (e.g., an effective diameter) is larger than the diameter of the fluid passageway 306. In other words, an arc length along a cross-section of the third plate 318 (e.g., the cross-sectioned arc seen in FIG. 3B) is greater than a diameter or size of the fluid passageway 306. Therefore, if the peripheral portion 328 of the third plate 318 is bent or moved in the downstream direction (e.g., as caused by forces induced by the flowing fluid), the diameter or flow area of the third plate 318 increases more than the diameter or flow area of the fluid passageway 306, thereby pressing the peripheral edge 328 of the third plate 318 into the wall 304 and, thus, maintains engagement with the wall 304 of the fluid passageway 306. This interaction causes relatively high normal forces between the wall 304 and the third plate 318, and the friction between the peripheral edge 328 of the third plate 318 and the wall 304 transfers at least part of the load away from the center support rod 322. Thus, the third plate 318 is not subjected to high stresses at or near the center of the plate as seen in prior noise attenuators. Also, the third plate 318 is prevented from bending or deforming in the downstream direction as seen in prior noise attenuators and, thus, does not suffer from such drawbacks.

In the illustrated example, the fourth plate 320 is curved similar to the third plate 318. In the illustrated example, the arc or radius of curvature of the third plate 318 and the fourth plate 320 is substantially the same. In other examples, the arc or radius of curvature may be different. In some examples, the first plate 314 and/or the second plate 316 are likewise curved. In some examples, only one plate (e.g., the third plate 318) is implemented in the noise attenuator 300. In other examples, more than one plate may be implemented. In some examples, one or more support rods (e.g., similar to the support rods 242 of FIGS. 2A and 2B) may be coupled between two or more of the plates 314-320 to further reduce bending or deformation of the plates 314-320.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:
1. An apparatus comprising:
  a noise attenuator body having a fluid passageway between an inlet and an outlet;
  a support rod extending along a central axis of the fluid passageway; and
  a plate coupled to the support rod and disposed in the fluid passageway, the plate having a plurality of openings defining fluid pathways through the plate, the plate being curved with a constant radius of curvature, the plate orientated in the fluid passageway such that a concave side of the plate faces the inlet.
2. The apparatus of claim 1, wherein the support rod extends through an opening in the plate.
3. The apparatus of claim 2, wherein the support rod is threaded, further including a fastener threadably coupled to the support rod to retain the plate in the fluid passageway.

4. The apparatus of claim 1, wherein an arc length along a cross-section of the plate is greater than a diameter of the fluid passageway.

5. The apparatus of claim 1, wherein the plate is a first plate, further including a second plate coupled to the support rod and disposed in the fluid passageway, the second plate spaced apart from the first plate.

6. The apparatus of claim 5, wherein the second plate is curved with a constant radius of curvature, the second plate oriented in the fluid passageway such that a concave side of the second plate faces the inlet.

7. The apparatus of claim 6, wherein the first plate has a first diameter and the second plate has a second diameter larger than the first diameter.

8. The apparatus of claim 6, wherein peripheral portions of the first plate and the second plate are engaged with a wall defining the fluid passageway.

9. The apparatus of claim 6, wherein the first and second plates are disposed within a tapered portion of the fluid passageway that expands from the inlet to the outlet.

10. The apparatus of claim 6, further including a third plate and a fourth plate disposed in the passageway upstream of the first and second plates, the third and fourth plates coupled to the support rod.

11. The apparatus of claim 10, wherein the third and fourth plates are perpendicular to the central axis of the fluid passageway.

12. The apparatus of claim 10, wherein a wall of the body defining the fluid passageway includes a ledge, a peripheral edge of the third plate engaged with the ledge.

13. The apparatus of claim 10, further including a cylindrical wall coupling the third and fourth plate, a cavity defined by the third and fourth plates and the cylindrical wall, and a plurality of springs disposed in the cavity.

14. An apparatus comprising:
a first plate and a second plate to be disposed in a fluid passageway of a noise attenuator, the first and second plates having a plurality of openings defining fluid pathways through the first and second plates, the first and second plates being curved such that concave sides of the first and second plates are to face an inlet of the fluid passageway, the first and second plates having a constant radius of curvature; and
a support rod extending through central openings in the first and second plates, the support rod coupled to the first and second plates, the first and second plates spaced apart from each other along the support rod.

15. The apparatus of claim 14, wherein a diameter of the second plate is larger than a diameter of the first plate.

16. The apparatus of claim 14, wherein a first portion of the support rod near the first plate is threaded and a second portion of the support rod near the second plate is threaded.

17. The apparatus of claim 16, further including:
a first fastener threadably coupled to the first portion of the support rod on a downstream side of the first plate; and
a second fastener threadably coupled to the second portion of the support rod on a downstream side of the second plate.

18. The apparatus of claim 14, further including a third plate and a fourth plate coupled to the support rod and spaced apart from the first and second plates.

19. The apparatus of claim 18, further including a cylindrical wall coupling the third and fourth plates, a cavity defined by the third and fourth plates and the cylindrical wall.

20. The apparatus of claim 19, further including a plurality of springs disposed in the cavity.

* * * * *